US011408356B2

(12) United States Patent
Vise et al.

(10) Patent No.: US 11,408,356 B2
(45) Date of Patent: Aug. 9, 2022

(54) METHOD OF OPERATING A COMBUSTION SYSTEM WITH MAIN AND PILOT FUEL CIRCUITS

(71) Applicant: General Electric Company, Schenectady, NY (US)

(72) Inventors: Steven Clayton Vise, Loveland, OH (US); Duane Douglas Thomsen, Lebanon, OH (US); Richard Wade Stickles, Loveland, OH (US); Clayton Stuart Cooper, Loveland, OH (US); Donald Lee Gardner, West Chester, OH (US); George ChiaChun Hsiao, West Chester, OH (US); Michael Anthony Benjamin, Cincinnati, OH (US); Shai Birmaher, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 977 days.

(21) Appl. No.: 15/723,303

(22) Filed: Oct. 3, 2017

(65) Prior Publication Data
US 2019/0101062 A1    Apr. 4, 2019

(51) Int. Cl.
*F02C 9/34*    (2006.01)
*F02C 7/228*   (2006.01)
(Continued)

(52) U.S. Cl.
CPC ............... *F02C 9/34* (2013.01); *F02C 7/228* (2013.01); *F02C 9/28* (2013.01); *F23R 3/34* (2013.01);
(Continued)

(58) Field of Classification Search
CPC .. F02C 7/228; F02C 9/26; F02C 9/263; F02C 9/28; F02C 9/34; F02C 9/44; F23R 3/34;
(Continued)

(56) References Cited

U.S. PATENT DOCUMENTS 6,810,671 B2   11/2004   Hansen
7,162,875 B2   1/2007    Fletcher et al.
(Continued)

FOREIGN PATENT DOCUMENTS

EP    1746347    1/2007
EP    2952811    12/2015
(Continued)

OTHER PUBLICATIONS

Machine Translated Japanese Office Action Corresponding to Application No. 2018186331 dated Nov. 22, 2019.
(Continued)

*Primary Examiner* — Arun Goyal
(74) *Attorney, Agent, or Firm* — Venable LLP; Edward A. Kmett; Michele V. Frank

(57) ABSTRACT

A system and method for operating a combustion system comprising a fuel nozzle defining at least one main fuel circuit and at least one pilot fuel circuit is generally provided. The method includes determining an overall flow of fuel, the overall flow of fuel defining a sum total fuel through the main fuel circuit and the pilot fuel circuit; determining a plurality of ranges of ratios of main fuel flow through the main fuel circuit versus pilot fuel flow through the pilot circuit from the overall flow of fuel, wherein each range of ratios is based on a combustion criterion different from one another; determining a resultant range of ratios of main fuel flow versus pilot fuel flow based on a hierarchy of combustion criteria, wherein the hierarchy of combustion criteria provides a priority ranking of the combustion criterion; and
(Continued)

flowing the overall flow of fuel to the main fuel circuit and the pilot fuel circuit based on the resultant range of ratios of main fuel flow versus pilot fuel flow.

20 Claims, 8 Drawing Sheets

(51) Int. Cl.
*F02C 9/28* (2006.01)
*F23R 3/34* (2006.01)

(52) U.S. Cl.
CPC .............. *F23R 3/343* (2013.01); *F23R 3/346* (2013.01); *F05D 2220/323* (2013.01); *F05D 2270/303* (2013.01); *F05D 2270/3013* (2013.01); *F23N 2237/02* (2020.01); *F23N 2237/04* (2020.01)

(58) Field of Classification Search
CPC .... F23R 3/343; F23R 3/346; F05D 2270/311; F05D 2270/312; F05D 2270/313; F23N 2037/02; F23N 2037/04
See application file for complete search history.

(56) References Cited

U.S. PATENT DOCUMENTS

| | | | |
|---|---|---|---|
| 7,451,601 B2 | 11/2008 | Taware et al. | |
| 7,506,512 B2 | 3/2009 | Schumacher et al. | |
| 7,966,801 B2 | 6/2011 | Umeh et al. | |
| 8,368,863 B2 | 2/2013 | Yang et al. | |
| 8,437,941 B2 | 5/2013 | Chandler | |
| 8,572,977 B2 | 11/2013 | Oda et al. | |
| 8,613,197 B2 | 12/2013 | Uhm et al. | |
| 8,850,821 B2 | 10/2014 | Khan et al. | |
| 8,863,526 B2 | 10/2014 | Hadley et al. | |
| 8,894,408 B2 | 11/2014 | Bulat et al. | |
| 2005/0166595 A1 | 8/2005 | Fletcher et al. | |
| 2007/0021899 A1* | 1/2007 | Griffin | F02C 9/34 701/100 |
| 2012/0196234 A1 | 8/2012 | Bulat et al. | |
| 2012/0275899 A1 | 11/2012 | Chandler | |
| 2014/0075949 A1 | 3/2014 | Prociw | |
| 2015/0159563 A1 | 6/2015 | Soni et al. | |
| 2017/0089266 A1* | 3/2017 | Alexander | F02C 7/228 |

FOREIGN PATENT DOCUMENTS

| | | |
|---|---|---|
| JP | 2008/255897 A | 10/2008 |
| JP | 2010/261452 A | 11/2010 |
| JP | 2012/026449 A | 2/2012 |
| JP | 2013/507553 A | 3/2013 |
| JP | 2013/096303 A | 5/2013 |
| JP | 2016/070063 A | 5/2016 |
| WO | WO2011/042037 | 4/2011 |

OTHER PUBLICATIONS

European Search Report Corresponding to Application No. 18198159.8 dated Dec. 13, 2018.

* cited by examiner

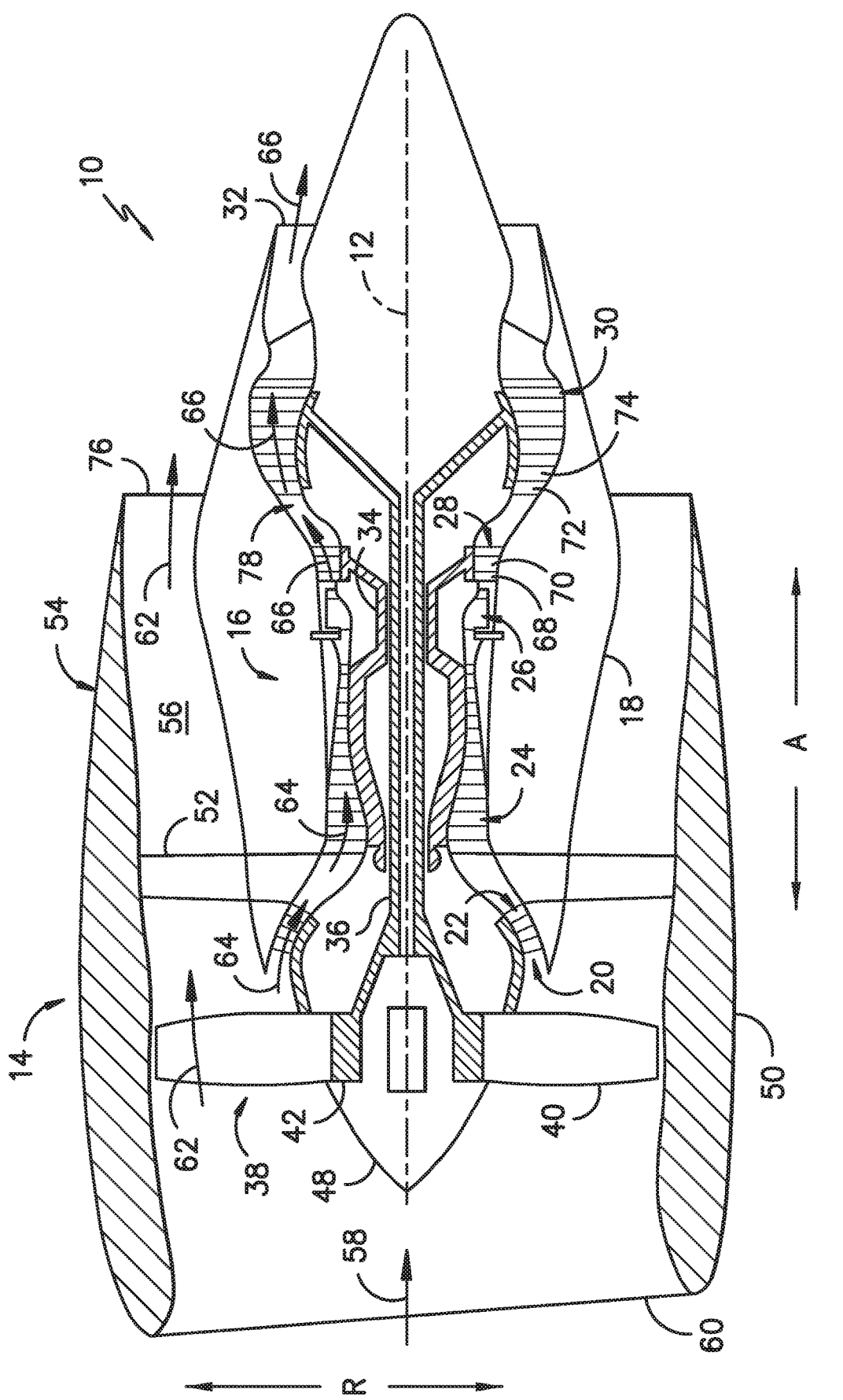
FIG. -1-

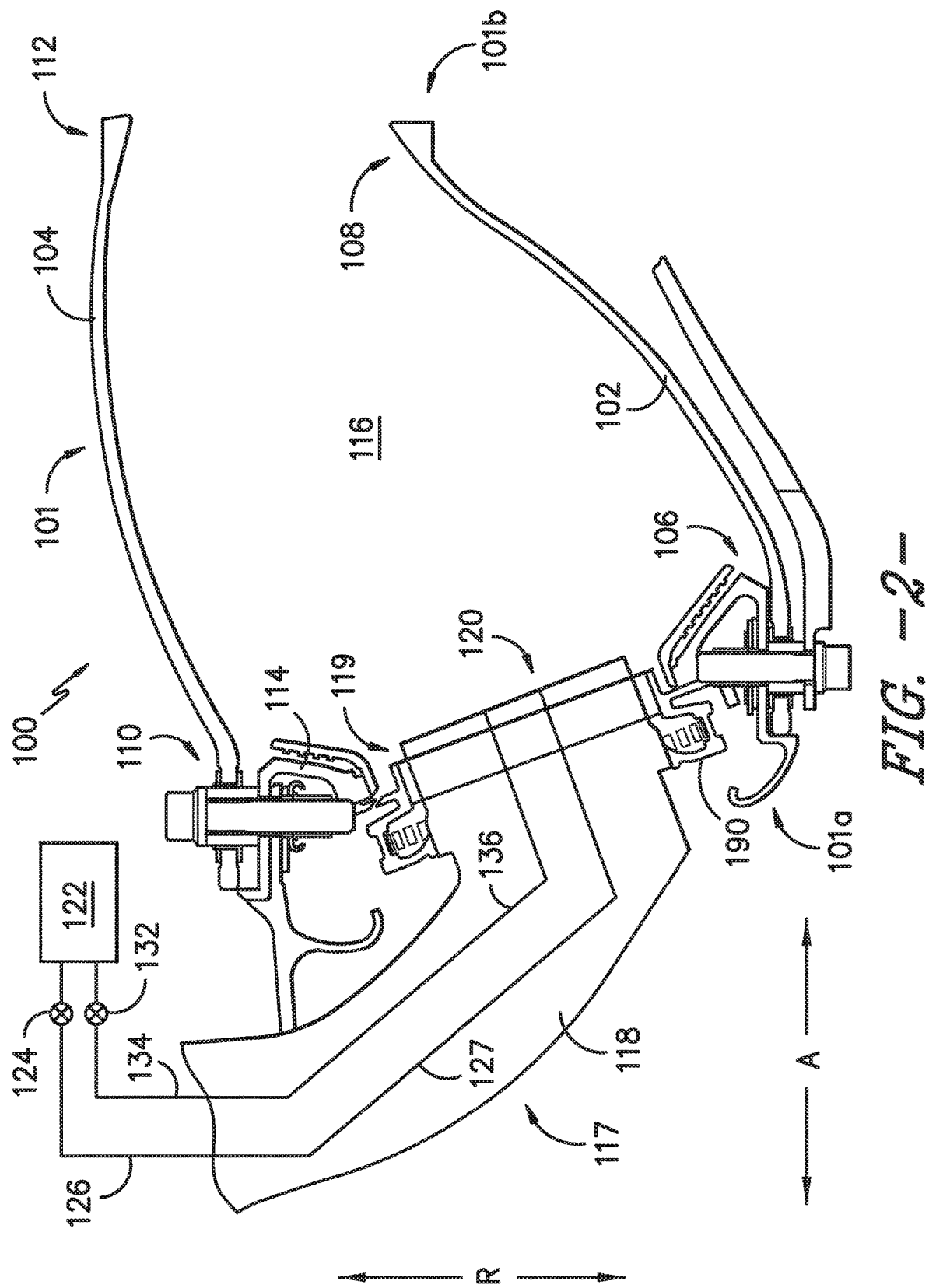

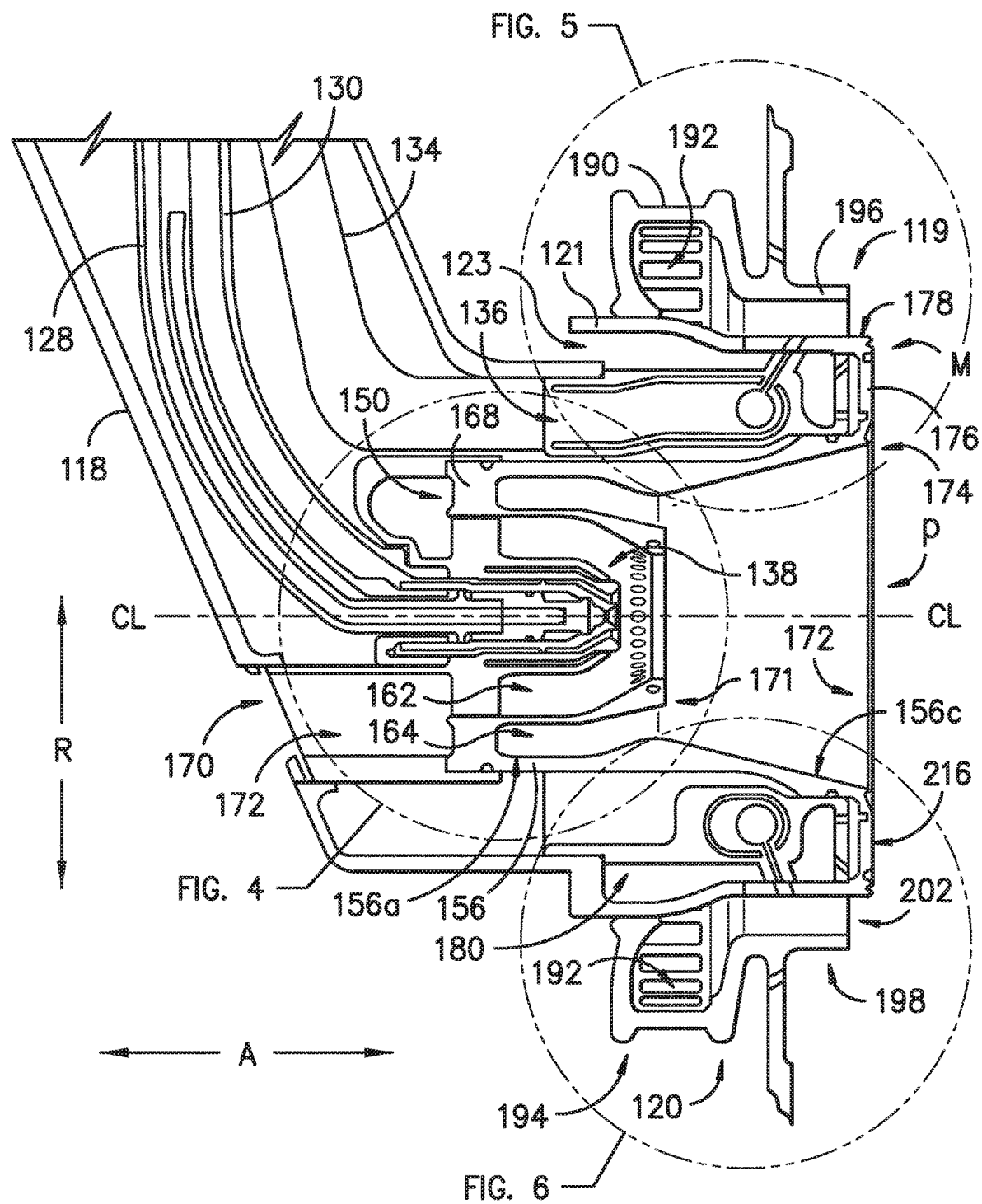
FIG. -3-

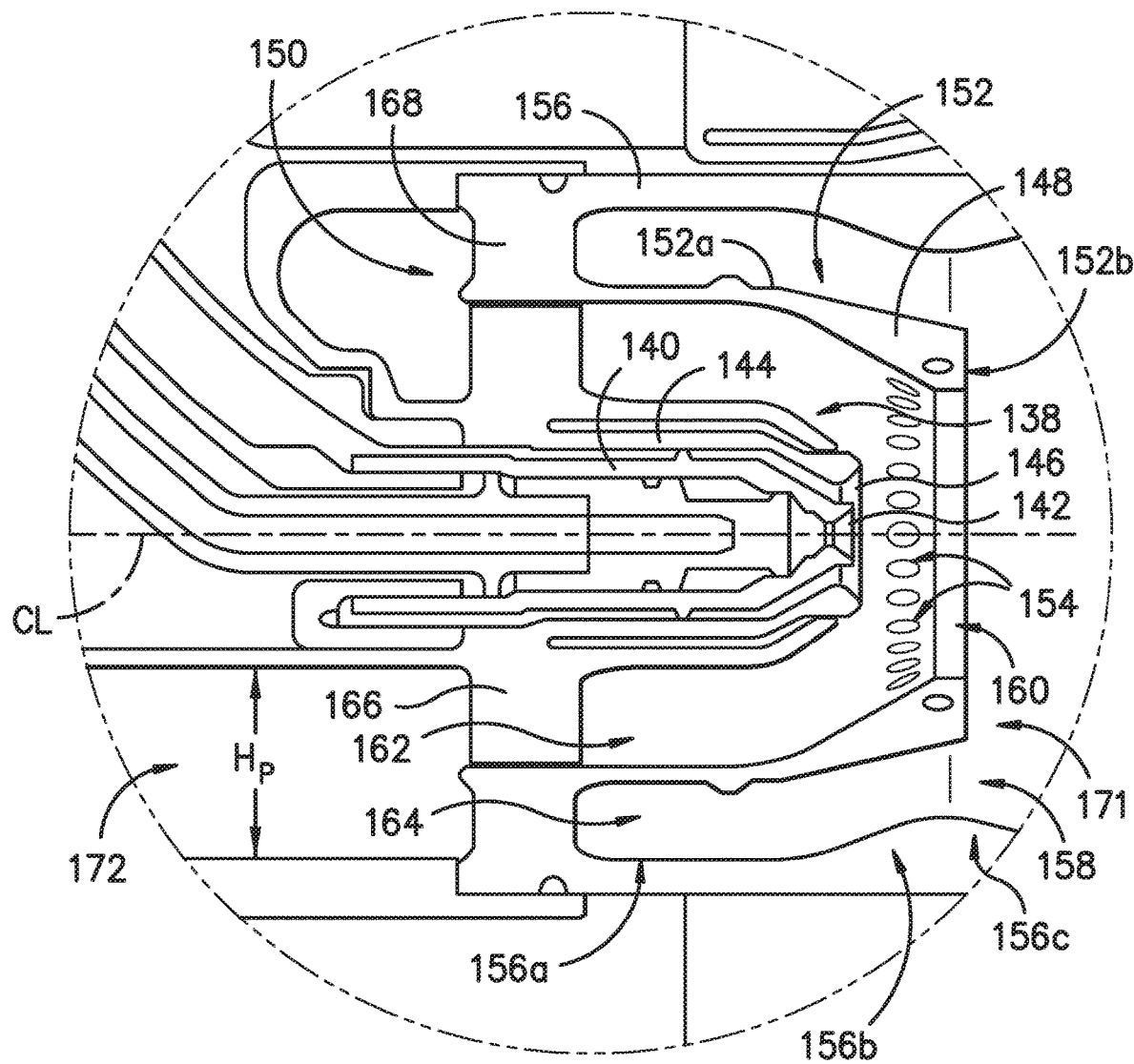
FIG. -4-

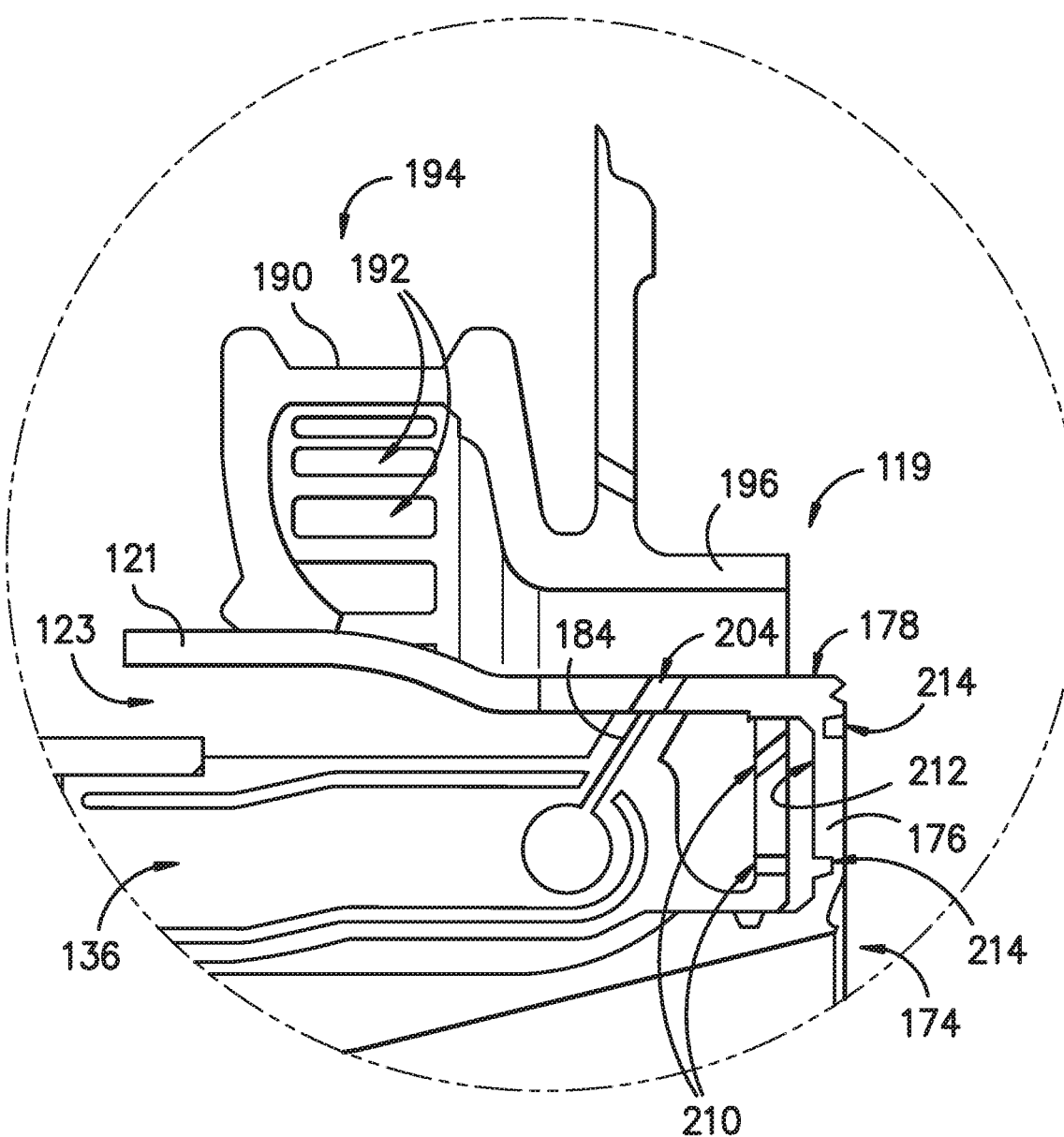
FIG. -5-

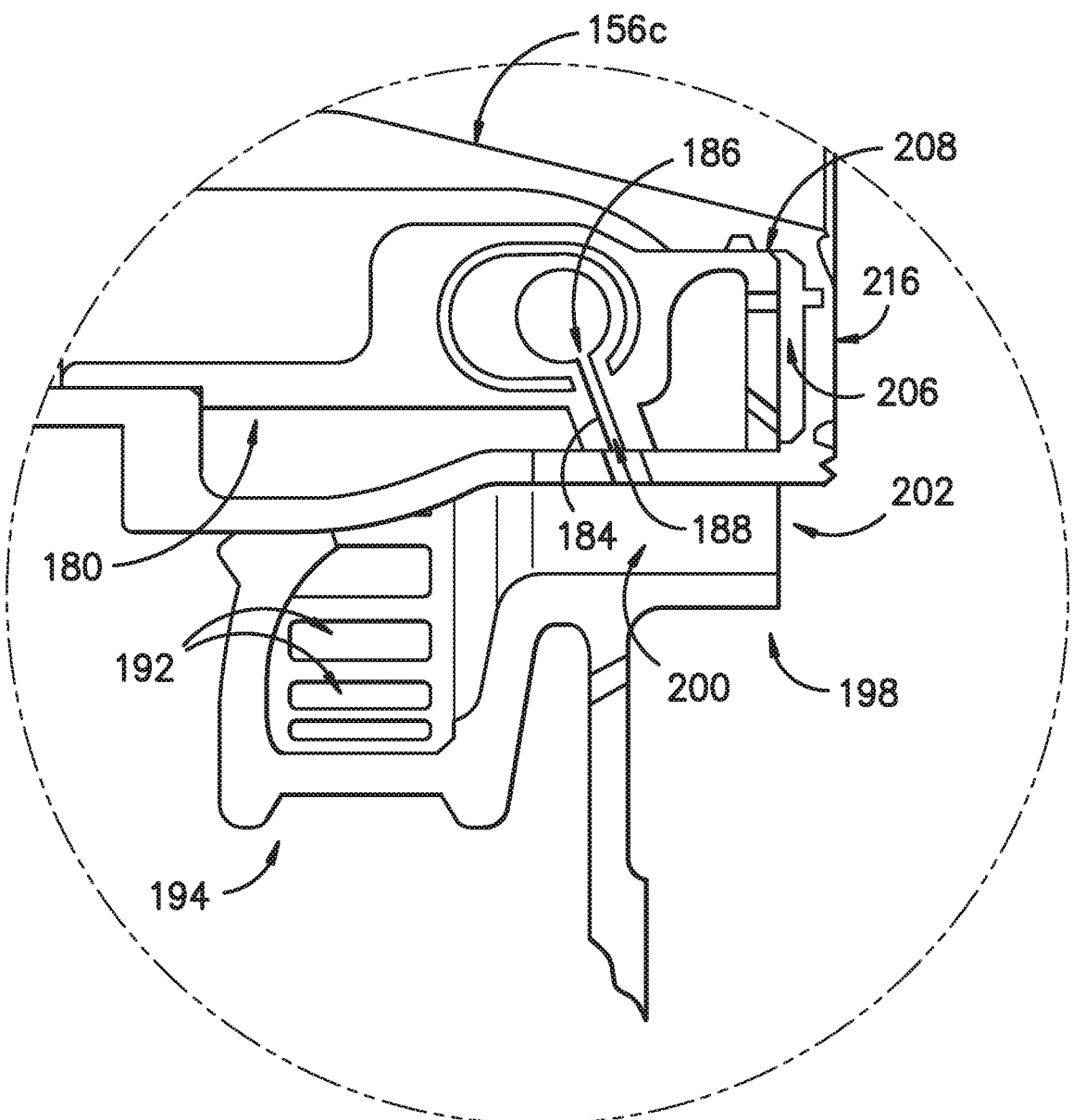
FIG. -6-

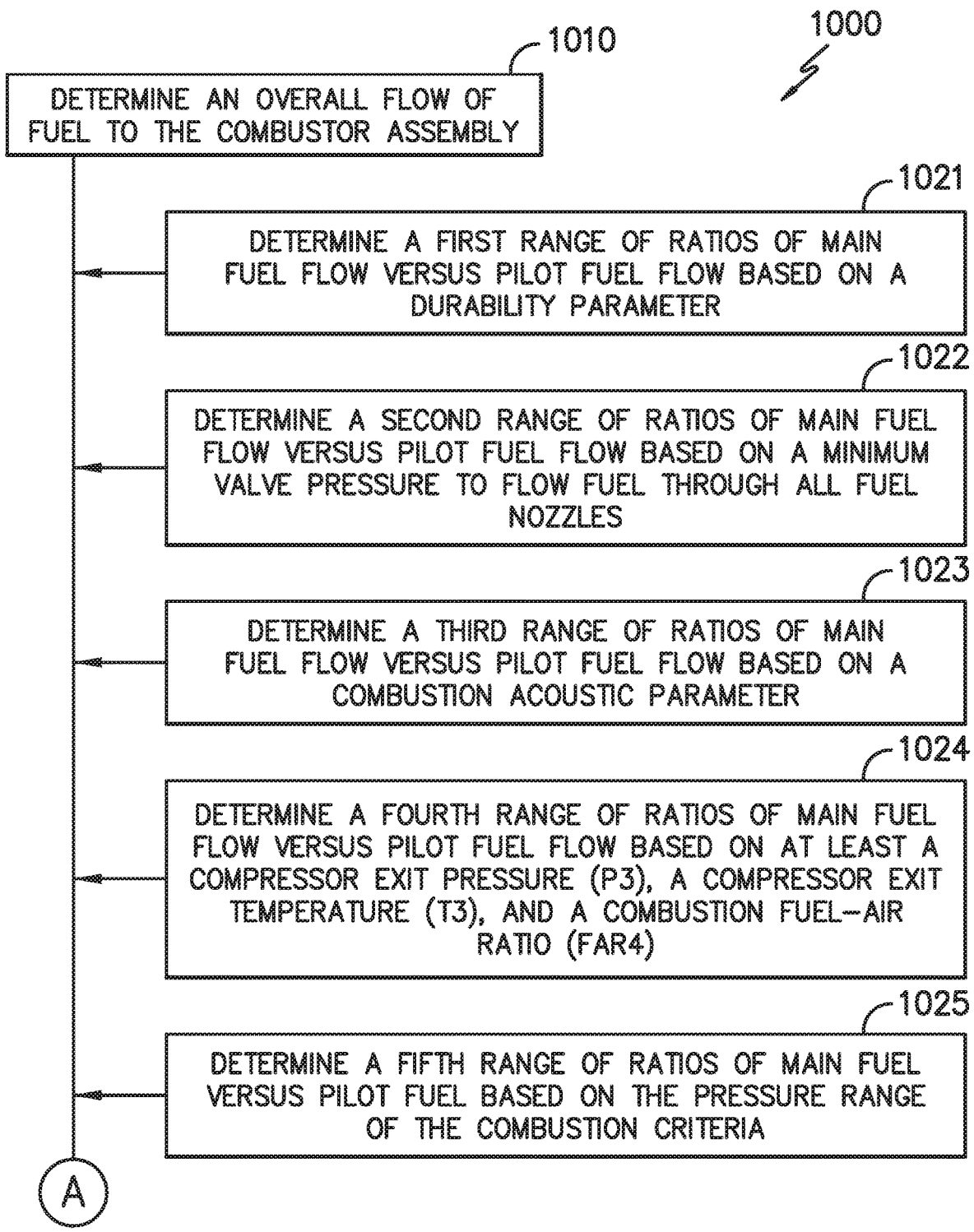
FIG. -7A-

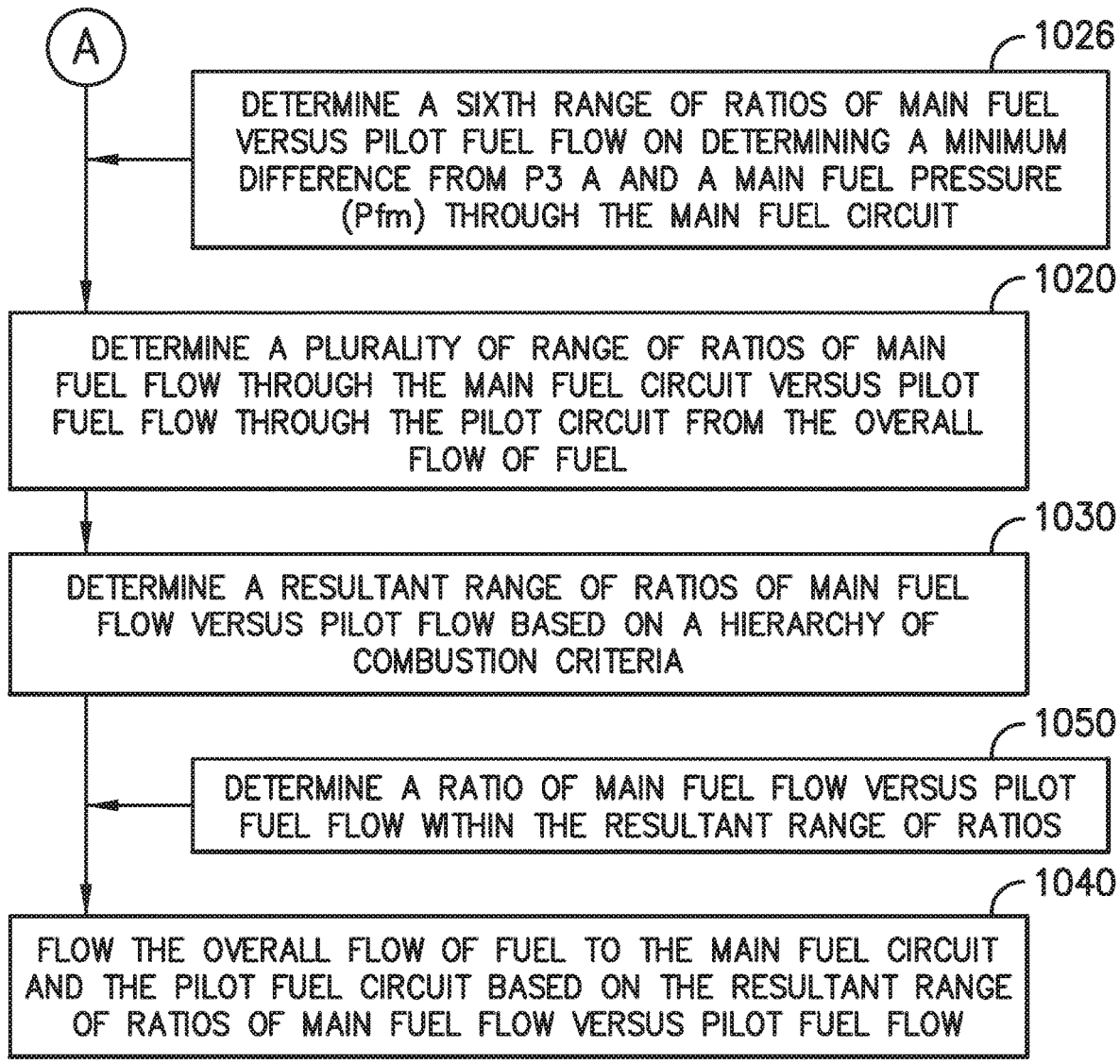
FIG. -7B-

METHOD OF OPERATING A COMBUSTION SYSTEM WITH MAIN AND PILOT FUEL CIRCUITS

FIELD

The present subject matter relates generally to gas turbine engine combustor assemblies. More particularly, the present subject matter relates to a method of operating a combustion system with main and pilot fuel circuits relative to a plurality of desired operating parameters.

BACKGROUND

Aircraft gas turbine engines include a combustor in which fuel is burned to input heat to the engine cycle. Typical combustors incorporate one or more fuel injectors whose function is to introduce liquid fuel into an air flow stream so that it can atomize and burn. Staged combustors have been developed to operate with low pollution, high efficiency, low cost, high engine output, and good engine operability. In a staged combustor, the fuel nozzles of the combustor are operable to selectively inject fuel through two or more discrete stages, each stage being defined by individual fuel flowpaths within the fuel nozzle. For example, the fuel nozzle may include a pilot stage that operates continuously, and a main stage that operates only at higher engine power levels. An example of such a fuel nozzle is a twin annular premixed swirler (TAPS) fuel nozzle, which requires two injection/mixing stages within the injector for low emissions.

Known systems and methods of control of a combustion system include controlling a pilot to main fuel split with one or more fixed pilot/main splits versus cycle parameter schedules. For example, the cycle parameter may define one or more engine conditions at the combustion system, including a combustion inlet temperature, a combustion inlet pressure, a main fuel pressure or flow, and a pilot fuel pressure or flow. However, such known schedules are generally inadequate for determining low power operation and emissions control, mid- and high-power operation and emissions control, combustion stability, flameout/lean blowout protection, and fuel burn/fuel efficiency. As such, there is a need for a method of operating a combustion system which controls the main and pilot fuel circuits that provides for the aforementioned inadequacies.

BRIEF DESCRIPTION

Aspects and advantages of the invention will be set forth in part in the following description, or may be obvious from the description, or may be learned through practice of the invention.

A method for operating a combustion system comprising a fuel nozzle defining at least one main fuel circuit and at least one pilot fuel circuit is generally provided. The method includes determining an overall flow of fuel, the overall flow of fuel defining a sum total fuel through the main fuel circuit and the pilot fuel circuit; determining a plurality of ranges of ratios of main fuel flow through the main fuel circuit versus pilot fuel flow through the pilot circuit from the overall flow of fuel, wherein each range of ratios is based on a combustion criterion different from one another; determining a resultant range of ratios of main fuel flow versus pilot fuel flow based on a hierarchy of combustion criteria, wherein the hierarchy of combustion criteria provides a priority ranking of the combustion criterion; and flowing the overall flow of fuel to the main fuel circuit and the pilot fuel circuit based on the resultant range of ratios of main fuel flow versus pilot fuel flow.

In various embodiments, the method further includes determining a ratio of main fuel flow versus pilot fuel flow within the resultant range of ratios, wherein the ratio of main fuel flow versus pilot fuel flow is based on an engine operating condition. In one embodiment, determining the ratio of main fuel flow versus pilot fuel flow based on the engine operating condition is further based on whether the engine operating condition is a steady state operating condition or a transient operating condition.

In another embodiment, determining the ratio of main fuel flow versus pilot fuel flow further includes determining a first ratio of main fuel flow versus pilot fuel flow based on a steady state engine operating condition; and determining a second ratio of main fuel flow versus pilot fuel flow based on a transient engine operating condition.

In one embodiment, the method further includes determining a plurality of ranges of pilot fuel flow to the pilot fuel circuit. Each range of pilot fuel flow defines a plurality of minimum fuel flow values and a plurality of maximum fuel flow values to the pilot fuel circuit. Each range of fuel flow is based on a combustion criterion.

In various embodiments, the combustion criterion includes two or more of an emissions limit, a lean blow out limit, a rich blow out limit, a combustion stability limit, a desired combustion efficiency, and a fuel pressure range.

In still various embodiments, the method further includes determining a minimum main fuel flow relative to a compressor exit pressure (P3) at which a main fuel flow is provided through the main fuel circuit. In one embodiment, determining the minimum P3 at which the main fuel flow is provided through the main fuel circuit is based on a maximum purge fluid pressure through the main fuel circuit.

In another embodiment, the method further includes determining a minimum difference from compressor exit pressure (P3) and a main fuel pressure (Pfm) through the main fuel circuit based at least on compressor exit temperature (T3) and P3.

In one embodiment, determining a plurality of ranges of ratios of main fuel flow versus pilot fuel flow further includes determining a first range of ratios of main fuel flow versus pilot fuel flow based on a durability parameter of one or more of a combustor liner, a dome assembly, a fuel nozzle, or a turbine nozzle.

In another embodiment, determining a plurality of ranges of ratios of main fuel flow versus pilot fuel flow further includes determining a second range of ratios of main fuel flow versus pilot fuel flow based on a minimum valve pressure to flow fuel through all fuel nozzles.

In still another embodiment, determining a plurality of ranges of ratios of main fuel flow versus pilot fuel flow further includes determining a third range of ratios of main fuel flow versus pilot fuel flow based on a combustion acoustic parameter.

In still yet another embodiment, determining a plurality of ranges of ratios of main fuel flow versus pilot fuel flow further includes determining a fourth range of ratios of main fuel flow versus pilot fuel flow based on at least compressor exit pressure (P3), compressor exit temperature (T3), and combustion fuel-air ratio (FAR4).

In one embodiment, the method further includes adjusting the flow of fuel to the main fuel circuit and the pilot fuel circuit based on a change in engine operating conditions.

Another aspect of the present disclosure is directed to a gas turbine engine including a combustion system comprising a fuel controller and a fuel nozzle. The fuel nozzle defines a main fuel circuit and pilot fuel circuit. The fuel controller comprises one or more processors and one or more memory devices. The one or more memory devices stores instructions that when executed by the one or more processors cause the one or more processors to perform operations. The operations include determining, via the fuel controller, a plurality of ranges of ratios of main fuel flow through the main fuel circuit versus pilot fuel flow through the pilot circuit from the overall flow of fuel, wherein each range of ratios is based on a combustion criterion different from one another; determining, via the fuel controller, a resultant range of ratios of main fuel flow versus pilot fuel flow based on a hierarchy of combustion criteria, wherein the hierarchy of combustion criteria provides a priority ranking of the combustion criterion; and flowing, through the fuel nozzle, the overall flow of fuel to the main fuel circuit and the pilot fuel circuit based on the resultant range of ratios of main fuel flow versus pilot fuel flow. The operations may further include determining and executing one or more steps of various embodiments of the method generally provided herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a schematic cross-section view of a combustor system of the gas turbine engine of FIG. 1, according to an exemplary embodiment of the present subject matter.

FIG. 3 provides a schematic cross-section view of a fuel nozzle assembly of the combustor system of FIG. 2, according to an exemplary embodiment of the present subject matter.

FIGS. 4, 5, and 6 provide enlarged views of segments of the fuel nozzle assembly illustrated in FIG. 3.

FIGS. 7A and 7B provide a flowchart outlining exemplary steps of a method of operating a combustion system with main and pilot fuel circuits relative to a plurality of desired operating parameters.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third", etc., may be used interchangeably to distinguish one component from another and are not intended to signify location, importance, or ordinal sequence of the individual components. Similarly, the terms "primary", "secondary", and "tertiary", etc., may be used interchangeably to distinguish one component from another and are not intended to signify location, importance, or ordinal sequence.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of methods of operating a combustion system including a main fuel circuit and a pilot fuel circuit are generally provided. The methods described herein may determine a fuel pressure/flow to the main fuel circuit and the pilot fuel circuit of a combustion system that provides low power operation and emissions control, mid- and high-power operation and emissions control, combustion stability, flameout/lean blow out protection, fuel burn/fuel efficiency, mitigation of undesired low, mid, and high power combustion dynamics/acoustics, combustor assembly and nozzle damage, and fuel nozzle coking.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

FIG. 2 provides a schematic cross-sectional view of a combustor system 100, e.g., for use in the gas turbine engine of FIG. 1, according to an exemplary embodiment of the present subject matter. As shown in FIG. 2, the combustor system 100 comprises a combustor 101 having a forward end 101a and an aft end 101b. The combustor 101 further includes an annular inner liner 102 and an annular outer liner 104. The inner liner 102 extends generally along the axial direction A between an upstream end 106 and a downstream end 108. Similarly, the outer liner 104 extends generally along the axial direction A between an upstream end 110 and a downstream end 112.

A combustor dome 114 extends generally along the radial direction R between the upstream end 106 of the inner liner 102 and the upstream end 110 of the outer liner 104. As shown in FIG. 2, the inner liner 102, the outer liner 104, and the combustor dome 114 define a combustion chamber 116 therebetween. In some embodiments, the combustor dome 114 is integral with the inner liner 102, i.e., the inner liner 102 and the combustor dome 114 are integrally formed as a single piece structure, but in other embodiments, the combustor dome 114 is integral with the outer liner 104, i.e., the outer liner 104 and the combustor dome 114 are integrally formed as a single piece structure. In still other embodiments, the combustor dome 114 is formed separately from the inner liner 102 and the outer liner 104, or in yet other embodiments, the combustor dome 114 is integral with both the inner and outer liners 102, 104, e.g., at least a first portion of the combustor dome 114 may be integral with the inner liner 102 and at least a second portion of the combustor dome 114 may be integral with the outer liner 104. The combustor dome 114 may be formed from any suitable material, e.g., a CMC material or a metallic material, such as a metal or metal alloy.

Further, the combustor system 100 includes a fuel nozzle assembly 117 having a fuel nozzle 118 defining a fuel nozzle outlet 120 at an outlet end 119 of the fuel nozzle 118. A main mixer 190 extends about the fuel nozzle outlet 120 as described in greater detail below. The fuel nozzle 118 is disposed through the combustor dome 114 such that the fuel nozzle outlet 120 is disposed at or adjacent the forward end 101a of the combustor 101 to direct a fuel-air mixture into the combustion chamber 116. More particularly, the exemplary fuel nozzle 118 is of a type configured to inject liquid hydrocarbon fuel into an airflow stream of the combustor system 100. The fuel nozzle 118 is of a "staged" type, meaning it is operable to selectively inject fuel through two or more discrete stages, each stage being defined by individual fuel flowpaths within the fuel nozzle 118.

The fuel flowrate may be variable within each of the stages. In the exemplary embodiment depicted in FIG. 2, the fuel nozzle 118 is connected to a fuel system 122 that is operable to supply a flow of liquid fuel at varying flowrates according to operational need. The fuel system 122 supplies fuel to a pilot control valve 124 that is coupled to a pilot fuel conduit 126, which in turn supplies fuel to a pilot supply line 127. In various embodiments, such as shown in regard to FIGS. 3-6, the pilot supply line 127 further subdivides into a primary pilot supply line 128 and a secondary pilot supply line 130 (FIG. 3) within the fuel nozzle 118. In still other embodiments, the pilot supply line 127 further subdivides into a tertiary or more pilot supply line. The fuel system 122 also supplies fuel to a main valve 132 that is coupled to a main fuel conduit 134, which in turn supplies a main fuel circuit 136 (FIG. 3) of the fuel nozzle 118. In various embodiments, the main fuel circuit 136 may further subdivide into two or more main fuel circuit lines egressing fuel into the combustion chamber 116.

Referring now to FIG. 3, a cross-section view is provided of a portion of the fuel nozzle assembly 117. Additionally, FIGS. 4, 5, and 6 provide enlarged views of segments of the portion of fuel nozzle assembly 117 illustrated in FIG. 3. For purposes of description, reference will be made to a centerline axis CL of the fuel nozzle assembly 117. In some embodiments, the centerline axis CL is generally parallel to the axial centerline 12 of the engine 10, but in other embodiments, the centerline axis CL may be at an angle relative to the engine axial centerline 12. The components of the illustrated fuel nozzle assembly 117 are disposed extending parallel to and surrounding the centerline axis CL, generally as a series of concentric rings. For instance, a pilot fuel injector 138 is disposed at or near the outlet 120 of the fuel nozzle 118 and is aligned with the centerline axis CL. As shown most clearly in FIG. 4, the pilot fuel injector 138 includes a generally annular inner wall 140 that defines a primary fuel orifice 142 and a generally annular outer wall 144 that defines a secondary fuel orifice 146. The primary pilot supply line 128 supplies fuel to the fuel nozzle 118 through the primary fuel orifice 142, and the secondary pilot supply line 130 supplies fuel to the fuel nozzle 118 through the secondary fuel orifice 146.

As shown in FIGS. 3 and 4, the inner wall 140 is disposed radially inward with respect to the outer wall 144 such that the outer wall 144 generally surrounds the inner wall 140 and the secondary fuel orifice 146 surrounds the primary fuel orifice 142. Further, in the depicted embodiment, the primary fuel orifice 142 generally is radially aligned with the secondary fuel orifice 146. That is, the primary and secondary fuel orifices 142, 146 are disposed generally at the same axial location within the fuel nozzle 118.

An annular pilot splitter 148 circumferentially surrounds the pilot fuel injector 138. The pilot splitter 148 includes an upstream portion 150 and a downstream portion 152. The upstream portion 150 generally is cylindrical in shape, while the downstream portion 152 generally is conical in shape. The downstream portion 152 generally is converging with respect to the centerline axis CL, having a wider first section 152a that gradually diminishes to a narrower second section 152b, where the second section 152b is downstream with respect to the first section 152a. A plurality of apertures 154 are defined in the second section 152b, e.g., the plurality of splitter apertures 154 may be defined along the circumference of the second section 152b and generally may be evenly spaced apart from one another. The splitter apertures 154 permit a flow of air therethrough, e.g., to enhance cooling of the pilot splitter 148 and thereby improve the splitter's durability. The flow of air is described in greater detail below.

An annular outer boundary wall 156 circumferentially surrounds the pilot splitter 148 and defines the outer boundary of a pilot portion P of the fuel nozzle 118. The outer boundary wall 156 includes a generally cylindrical first portion 156a, a converging second portion 156b, and a diverging third portion 156c, such that a throat 158 is defined between the second and third portions 156b, 156c. As shown in FIG. 3, the first, second, and third portions 156a, 156b, 156c are axially arranged in flow order, i.e., the first portion 156a is upstream of the second portion 156b, which is upstream of the third portion 156c. Further, the converging second portion 156b of the outer boundary wall 156 generally follows or is parallel to the converging downstream portion 152 of the pilot splitter 148. As such, a downstream end 160 of the pilot splitter 148 is disposed generally within the throat 158 defined by the converging and diverging portions 156b, 156c of the outer boundary wall 156.

As illustrated in FIGS. 3 and 4, an inner air circuit 162 is defined between the pilot fuel injector 138 and the pilot splitter 148, and an outer air circuit 164 is defined between the pilot splitter 148 and the outer boundary wall 156. A circumferential array of inner swirl vanes 166 radially extends from the pilot fuel injector 138 to the upstream portion 150 of the pilot splitter 148. Similarly, a circumferential array of outer swirl vanes 168 radially extends from the upstream portion 150 of the pilot splitter 148 to the first portion 156a of the outer boundary wall 156. The inner swirl vanes 166 are shaped and oriented to induce a swirl into air flow passing through the inner air circuit 162, and the outer swirl vanes 168 are shaped and oriented to induce a swirl into air flow passing through the outer air circuit 164.

Upstream of the inner and outer air circuits 162, 164, the fuel nozzle 118 defines a pilot air inlet 170 that permits an ingress of air into the pilot portion P. The air flows into a pilot airflow passage 172, which is split into the inner air circuit 162 and the outer air circuit 164 by the pilot splitter 148. At the downstream end 160 of the pilot splitter 148, the inner and outer air circuits 162, 164 merge back into the single pilot airflow passage 172, which extends through the remainder of the pilot portion P of the fuel nozzle 118. As shown in FIG. 3, the third portion 156c of the outer boundary wall 156 defines the outer boundary of the airflow passage 172 through the downstream end of the pilot portion P. The inner air circuit 162 and outer air circuit 164, including inner and outer swirl vanes 166, 168, and the third portion 156c of the outer boundary wall 156 form a pilot swirler 171. The pilot swirler 171 directs and controls the fluid flow, including the flow of air and the mixture of air and fuel, through the pilot portion P of the fuel nozzle 118. More particularly, the air swirls through the inner and outer swirl vanes 166, 168 and then expands as it is mixed with fuel in the generally conically shaped downstream portion of the pilot swirler 171 defined by the outer boundary wall third portion 156c.

Further, the fuel nozzle 118 circumferentially surrounds the pilot portion P. In particular, an outer wall 121 of the fuel nozzle 118 defines the fuel nozzle outlet 120 and extends axially to a radially outermost end 178 of the heat shield 176. As illustrated in FIG. 3, the outer wall 121 is radially spaced apart from the outer boundary wall 156. Additionally, the outer wall 121 defines an opening 123 that permits a flow of air into the space between the outer wall 121 and the outer boundary wall 156. The flow of air may provide cooling to the fuel nozzle outlet end 119 and the fuel nozzle components in the vicinity of the outlet end 119.

The pilot fuel injector 138 defines a relatively small, stable pilot flame or burn zone. The pilot burn zone is centrally located within the annular combustor flow field in a radial sense. Fuel is supplied to the pilot fuel injector 138 via the primary and secondary pilot supply lines 128, 130. Air is supplied through the pilot airflow passage 172. The pilot airflow passage 172 provides a relatively high airflow; stated differently, the portion of the total combustor airflow directed through the pilot airflow passage 172 is relatively high, particularly compared to known TAPS combustor designs.

Continuing with FIG. 3, an annular main portion M extends circumferentially about the annular pilot portion P of the fuel nozzle 118. The main portion M includes a main fuel injector 180, which is supplied with fuel through a main fuel circuit 136. The main fuel circuit 136 is coupled to and supplied with fuel by the main fuel conduit 134. As illustrated in FIGS. 3, 5, and 6, the main fuel injector 180 includes a plurality of injection ports 184. Although generally depicted as angled downstream with respect to the centerline axis CL of the fuel nozzle assembly 117, in various embodiments the plurality of injection ports 184 may be disposed substantially straight or perpendicular relative to the centerline axis CL of the fuel nozzle assembly 117. That is, each injection port 184 has an inlet end 186 and an outlet end 188, and the outlet end 188 is oriented downstream with respect to the inlet end 186 and at an angle with respect to the centerline axis CL. The inlet end 186 permits an ingress of fuel from the main fuel circuit 136 into the injection port 184, and the outlet end 188 permits an egress of fuel from the injection port 184. As such, the angled injection ports 184 permit the egress of fuel from the main fuel circuit 136 toward the center of the combustion chamber 116 as described in greater detail below.

The fuel nozzle assembly 117 further includes an annular main mixer or swirler 190 that circumferentially surrounds the fuel nozzle 118 adjacent the main fuel injector 180. The main mixer 190 defines a plurality of inlet apertures 192 about its circumference to permit airflow into the main mixer 190. As shown in FIGS. 3, 5 and 6, the main mixer inlet apertures 192 are defined at a forward or upstream end 194 of the main mixer 190. In some embodiments, the main mixer 190 and its inlet apertures 192 may be shaped and/or oriented to induce a swirl into air flow passing through the main mixer 190. Downstream or aft of the apertures 192, the main mixer 190 includes an annular main mixer wall 196 that extends to an aft or downstream end 198 of the main mixer 190 and that is radially spaced apart from the outer wall 121 of the fuel nozzle 118. A main airflow passage 200 is defined between the main mixer wall 196 and the fuel nozzle outer wall 121. Further, the main mixer wall 196 defines a main mixer outlet 202 at the downstream end 198. As such, air flows into the main mixer 190 through the inlet apertures 192, continues through the main airflow passage 200, and exits the main mixer 190 through the main mixer outlet 202. The main mixer 190 provides a relatively low airflow; stated differently, the portion of the total combustor airflow directed through the main mixer 190 is relatively low, particularly compared to known TAPS combustor designs. The airflow to and through the main portion M is described in greater detail below.

As also illustrated in FIGS. 3, 5, and 6, the fuel nozzle outer wall 121 defines an aperture 204 therein that is aligned with the injection port 184. It will be appreciated that the outer wall 121 defines a plurality of apertures 204 that are each aligned with one of the injection ports 184. As previously stated, the injection ports 184 may be angled downstream with respect to the centerline axis CL of the fuel nozzle 118, or straight/perpendicular relative to the centerline axis CL, or combinations thereof. The outer wall apertures 204 similarly are defined at an angle with respect to the centerline axis CL; the angle of the apertures 204 may be substantially the same as the angle of the injection ports 184 as shown in the exemplary embodiment of FIGS. 3, 5, and 6. Moreover, the outer wall apertures 204 are defined downstream of the inlet apertures 192, such that the fuel is injected within the main airflow passage 200 defined between the main mixer wall 196 and the fuel nozzle outer wall 121. Accordingly, the fuel mixes in the main airflow passage 200 with the airflow introduced into the main mixer 190 through the main mixer apertures 192, and the fuel-air mixture continues to flow downstream and exits the main mixer 190 into the combustion chamber 116 through the main mixer outlet 202. As previously described, the angled injection ports 184 and outlet wall apertures 204 help direct the fuel toward the middle of the combustor 101, such that the fuel within the combustor is more concentrated toward a center of the combustor. As such, the angled fuel injection may help control the profile and/or pattern factor of the combustor 101, as well as allow a higher power operation of the engine and increase the durability of the inner and outer liners 102, 104 and other combustor hardware by directing the fuel and combustion gases away from the combustor hardware.

As previously described, the inner liner 102 and outer liner 104 may be formed from a ceramic matrix composite (CMC) material, which is a non-metallic material having high temperature capability. In some embodiments, the combustor dome 114 also may be formed from a CMC material. More particularly, the combustor dome 114 may be integrally formed with the inner liner 102 and/or outer liner 104 from a CMC material, such that the combustor dome 114 and the inner liner 102 and/or outer liner 104 are a single piece. In other embodiments, the combustor dome 114 may be formed separately from the inner and outer liners, either as a separate CMC component or from another suitable material, such as a metal or metal alloy. Still further, one or more components or portions of the combustion system 100, such as, but not limited to, the liners 102, 104, the combustor dome 114, and the fuel nozzle assembly 117, may be formed of a CMC material or one or more metals or metal alloys. The metals or metal alloys include one or more appropriate for gas turbine engine combustion systems, including, but not limited to, nickel, titanium, iron or steel, or alloys of each, or combinations thereof.

Referring now to FIGS. 7A and 7B, an exemplary flowchart of a method of operating a combustion system comprising a fuel controller and a fuel nozzle defining a main fuel circuit and pilot fuel circuit is generally provided (hereinafter, "method 1000"). The combustion system, the fuel controller, and the fuel nozzle may be configured substantially similarly as shown and described in regard to FIGS. 1-6. For example, the method 100 may be implemented with the fuel system 122 and the combustor system 100 including the fuel nozzle assembly 117 and fuel nozzle 118 as shown and described in regard to FIGS. 1-6. The fuel system 122 and the fuel nozzle assembly 117 together may define the main fuel circuit as the main fuel conduit 134 and the main fuel circuit 136, in which the main fuel circuit 136 egresses fuel to the combustion chamber 116 such as shown in FIG. 2. The fuel system 122 and the fuel nozzle assembly 117 together may further define the pilot fuel circuit as the pilot fuel conduit 126 and a pilot supply line 127 through the fuel nozzle assembly 117 egressing to the combustion chamber 116, such as shown in FIG. 2. In various embodiments, the fuel system 122 and the fuel nozzle assembly 117 together may further define the pilot fuel circuit as the pilot fuel conduit 126, the primary pilot supply line 128, and the secondary pilot supply line 130, in which each of the supply lines 128, 130 egress fuel to the combustion chamber 116 through their respective fuel orifices 142, 146, such as shown and described in regard to FIGS. 1-6.

However, it should be appreciated that the method 1000 may generally be implemented with a fuel system and fuel nozzle assembly together defining one or more main fuel circuits (e.g., a primary, a secondary, a tertiary, etc.) configured to provide a first supply of fuel and one or more pilot fuel circuits (e.g., a primary, a secondary, a tertiary, etc.) configured to provide a second supply of fuel. As such, various embodiments of the method 1000 may be implemented with a fuel system and a fuel nozzle not limited to the embodiments shown and described in regard to FIGS. 1-6. Furthermore, the embodiments of the fuel system and fuel nozzle shown and described in regard to FIGS. 1-6 may be provided for illustrative purposes of generally describing embodiments of the method 1000, without necessarily being limited by the embodiments shown and described in regard to FIGS. 1-6.

The embodiments of the method 1000 described herein may control a fuel split between the pilot fuel circuit generally configured for startup/ignition and low power operation versus the main fuel circuit generally configured for mid- and high-power operation, the control generally providing improved emissions, combustion stability, fuel burn, and flameout/lean blowout protection. Still further, the embodiments of the method 1000 generally determine and provide a fuel split that satisfies a plurality of desired outputs, including desired fuel burn, emissions, combustion stability, flameout protection, coking protection, and combustor assembly durability.

The method 1000 includes at 1010 determining an overall flow of fuel to the combustor assembly (e.g., combustor assembly 100). The overall flow of fuel defines a sum total fuel through a main fuel circuit and a pilot fuel circuit. As previously described herein, the main fuel circuit, the pilot fuel circuit, or both, may include one or more lines, conduits, passages, etc. providing proportional or independent flow rates or pressures of fuel to the combustion chamber (e.g., combustion chamber 116). Determining the overall flow of fuel to the combustor assembly may further include determining an overall fuel-air ratio at the combustion chamber. In various embodiments, determining the overall flow of fuel is based on a desired fan or low spool speed (e.g., N1 or Nfan) or a desired engine pressure ratio.

The method 1000 further includes at 1020 determining a plurality of ranges of ratios of main fuel flow through the main fuel circuit versus pilot fuel flow through the pilot circuit from the overall flow of fuel. Each range of ratios is based on a combustion criterion different from one another.

In various embodiments, the combustion criterion includes two or more of an emissions limit, a lean blow out limit, a rich blow out limit, a fuel coking limit, a combustion stability limit, a desired combustion efficiency, a fuel pressure range, and a durability parameter. In various embodiments, the desired combustion efficiency may include a minimum allowed or desired combustion efficiency relative to an engine operating condition. The emissions limit may include, but is not limited to, one or more criterion based on a limit of one or more oxides of nitrogen (NOx), a smoke number (SN), an unburned hydrocarbons limits (UHC), or a carbon monoxide limit (CO). In various embodiments, the emissions limit may further include a carbon dioxide limit (CO2). In still various embodiments, the emissions limit may further include one or more emissions criterion controlled or regulated by one or more regulatory authorities, national or transnational conventions, or agreements (e.g., Convention on International Civil Aviation, Federal Aviation Authority, European Aviation Safety Agency, etc.). However, it should be appreciated that although the emissions limit may include one or more additional criterion that may be identified by one or more regulatory authorities, the quantity or magnitude of the emissions limit is not limited to those included or recited by one or more regulatory authorities.

In one embodiment, the method 1000 further includes at 1021 determining a first range of ratios of main fuel flow versus pilot fuel flow based on a durability parameter. In various embodiments, the durability parameter is based on one or more of a combustor liner, a dome assembly, a fuel nozzle, or a turbine nozzle. In various embodiments, the durability parameter is one or more of a surface temperature, an internal temperature, a difference in temperature between a hot side and a cold side, and a desired required life (e.g., period over which the combustor assembly, or portions thereof, is able to operate at one or more operating conditions). The hot side generally refers to a portion adjacent to the combustion chamber 116 or proximate thereto in contrast to an opposite portion, face, or side of the part, component, or assembly as the cold side.

In another embodiment, the method 1000 further includes at 1022 determining a second range of ratios of main fuel flow versus pilot fuel flow based on a minimum valve pressure to flow fuel through all fuel nozzles. For example, determining the second range of ratios may be based on a minimum valve opening pressure at generally all engine operating conditions such as to mitigate closure of individual fuel circuits (e.g., each main fuel conduit 134, main fuel circuit 136, pilot fuel conduit 126, pilot supply line 127, primary pilot supply line 128, secondary pilot supply line 130, etc. of each fuel nozzle assembly 117 of the combustor assembly 100) and permit flow of fuel to the combustion chamber 116. As another example, each main fuel circuit, pilot fuel circuit, or both, may define a minimum flow rate over delta pressure from the circuit to the combustion chamber. As such, determining a second range of ratios may further include determining a minimum fuel flow through each main fuel circuit and each pilot fuel circuit.

In still another embodiment, the method 1000 further includes at 1023 determining a third range of ratios of main fuel flow versus pilot fuel flow based on a combustion acoustic parameter. In one embodiment, the method 1000 at 1023 may further include determining a maximum ratio of main fuel flow to pilot fuel flow to mitigate audible acoustics or growl (e.g., undesired tones or acoustics perceptible to the human ear). In various embodiments, growl may be defined at approximately 400 Hz or less. In various embodiments, mitigating audible acoustics may further mitigate structural degradation of parts or components of the combustor assembly and fuel system (e.g., the combustor assembly 100, the fuel system 122) such as by mitigating vibrations or pressure oscillations that may induce fatigue at one or more components or portions of the combustor assembly, the fuel system, or both. In various embodiments, determining the third range of ratios of main fuel flow versus pilot fuel flow may be based more specifically on a combustion acoustic parameter at a low power operating condition.

In various embodiments of the engine further including a sensor detecting, monitoring, or measuring instantaneous combustion pressure P4 at the combustion chamber, determining the maximum ratio of main fuel flow through the main fuel circuit versus the pilot fuel flow through the pilot fuel circuit is further based on fluctuating pressure, P4'. In other embodiments, the method at 1023 is further based on a chart, table, curve, or transfer function defining P4 or P4'. In still various embodiments, P4' defines high frequency combustion dynamics. For example, determining the maximum ratio of main fuel flow to pilot fuel flow is further based on a desired P4 or P4' limit. Determining the maximum ratio of main fuel flow versus pilot fuel flow to the combustion chamber mitigates combustion instability, such as resulting in pressure oscillations, acoustics, and vibrations.

In still another embodiment, determining a maximum ratio of main fuel flow versus pilot fuel includes determining a fixed flow rate of fuel through the pilot fuel circuit. For example, in one embodiment, determining the maximum ratio of main fuel to pilot fuel includes a pilot fuel flow rate generally suitable across all engine operating conditions.

In another embodiment, the method 1000 may further include at 1024 determining a fourth range of ratios of main fuel flow versus pilot fuel flow based on at least a compressor exit pressure (P3), a compressor exit temperature (T3), and a combustion fuel-air ratio (FAR4). In other embodiments, the method 1020 is based on one or more of a high rotor rotational speed N2, a compressor inlet temperature T2, and an overall rate of flow of fuel to the main and pilot fuel circuits (Wf). In still another embodiment, the method at 1020 is based on one or more parameters determining a combustion state.

In still another embodiment, the method 1000 may further include at 1025 determining a fifth range of ratios of main fuel versus pilot fuel based on the fuel pressure range of the combustion criteria. The fuel pressure range may indicate a minimum and maximum allowable fuel pressure based on one or more supply pumps, valves, metering or restrictor openings, or further based one or more cross sectional areas, volumes, or other flow rate or pressure capabilities of the fuel system. In one embodiment, the determining the fifth range of ratios of main fuel versus pilot fuel at 1025 is based on a minimum main fuel flow provided through the main fuel circuit. In various embodiments, determining the minimum main fuel flow provided through the main fuel circuit defines a threshold main fuel pressure below which fuel is prevented from flowing through the main fuel circuit. In various embodiments, determining the minimum main fuel flow further includes defining a minimum air pressure to purge the main fuel circuit when one or more main fuel circuits is not providing fuel to the combustion chamber 116. For example, in one embodiment at 1025, determining the minimum main fuel flow provided through the main fuel circuit is based on a maximum purge fluid pressure (e.g., air, inert gas) through the main fuel circuit. Defining the minimum air pressure to purge the main fuel circuit may define coking prevention at the main fuel circuit, such as at one or more of the main fuel conduit 134 and the main fuel circuit 136 of each fuel nozzle assembly 117. In still various embodiments, determining a fifth range of ratios is further based on determining a minimum main fuel flow relative to a compressor exit pressure (P3) at which a main fuel flow is provided through the main fuel circuit.

The method 1000 may further include at 1026 determining a sixth range of ratios of main fuel versus pilot fuel flow based on determining a minimum difference from P3 and a main fuel pressure (Pfm) through the main fuel circuit based at least on P3. In various embodiments, determining the minimum difference from P3 and Pfm through the main fuel circuit is determined at one or more of the main fuel conduit 134 of the fuel system 122 and the main fuel circuit 136 of the fuel nozzle assembly 117. In one embodiment, determining the minimum difference from P3 and Pfm is more specifically determined at the main fuel conduit 134 coupled to each main fuel circuit 136 of each fuel nozzle assembly 117. Determining the minimum difference between P3 and Pfm may ensure sufficiently high pressure differential between each fuel nozzle assembly 117 to mitigate pressure or flow fluctuations between each main fuel circuit 136 of each fuel nozzle assembly 117.

It should be appreciated that although the method 1000 includes determining a plurality of ranges of ratios of main fuel flow versus pilot fuel flow through the fuel system and combustor assembly for combustion, each range or ratios generally defines distinct ranges of values not exclusive of one another. For example, two or more of the ranges of ratios may be substantially similar although determined based on different criteria. As another example, two or more of the ranges of ratios may be at least partially exclusive such that each range of ratios is at least partially non-overlapping. As yet another example, two or more of the ranges or ratios may be mutually exclusive such that each range of ratios is entirely non-overlapping.

The method 1000 further includes at 1030 determining a resultant range of ratios of main fuel flow versus pilot fuel flow based on a hierarchy of combustion criteria. The hierarchy of combustion criteria provides a priority ranking of the combustion criterion. For example, the method 1000 at 1030 may include defining a priority or ranking for each of combustion criterion. The method at 1030 may further include defining a priority ranking for each range of ratios corresponding to each combustion criterion. If each range of ratios of the plurality of ranges of ratios determined at 1020 is at least partially overlapping, the resultant range of ratios may define the overlapping range of ratios of main fuel flow versus pilot fuel flow. Otherwise, the hierarchy of combustion criteria is applied to determine whether one range of ratios is utilized rather than another range of ratios. Stated alternatively, the hierarchy of combustion criteria is applied to determine which of the determined ranges of ratios at step 1020 may be obviated when determining the resultant range of ratios at 1030.

As such, the range of ratios corresponding to the higher priority combustion criterion will be utilized rather than one or more ranges of ratios of lesser ranking that are non-overlapping with the higher priority combustion criterion. Stated alternatively, the ranges of ratios corresponding to lesser priority combustion criterion that are mutually exclusive from the range of ratios corresponding to the higher priority combustion criterion will be obviated when determining the resultant range of ratios. As such, the method 1000 further includes at 1040 flowing the overall flow of fuel to the main fuel circuit and the pilot fuel circuit based on the resultant range of ratios of main fuel flow versus pilot fuel flow.

In various embodiments, determining the hierarchy of combustion criteria may be based at least on, but not limited to, a type of propulsion system or apparatus (e.g., marine or industrial gas turbine, subsonic propulsion, supersonic propulsion, rotary or fixed wing apparatus, etc.), engine operating condition (e.g., thrust or load output level, part-load or full-load condition, steady state or transient, etc.), an environmental condition (e.g., altitude, air temperature, pressure, humidity, air speed, etc.), or rates of changes thereof, or combinations thereof. As such, the priority ranking of combustion criterion may vary based at least on one or more of the aforementioned factors, or combinations thereof.

At 1050, the method 1000 may further include determining a ratio of main fuel flow versus pilot fuel flow within the resultant range of ratios. The ratio of main fuel flow versus pilot fuel flow is based on an engine operating condition. In various embodiments, determining the ratio of main fuel flow versus the pilot fuel flow within the resultant range of ratios is further based on whether the engine operating condition is a steady state operating condition or a transient operating condition. For example, determining the resultant ratio of main fuel flow versus pilot fuel flow may be based on one or more of compressor exit temperature (T3), compressor inlet temperature (T2), high rotor rotational speed (e.g., N2 or Nhigh), or one or more control signals indicating a steady state or transient engine operation. In still various embodiments, determining the ratio of main fuel flow versus the pilot fuel flow is based on at least on combustion efficiency, emissions, or both.

In various embodiments, the engine operating condition may include, but not limited to, steady state conditions generally defining ignition, ground idle, takeoff, climb, cruise, flight idle, and approach, or transient conditions generally therebetween. Startup, ignition, ground idle, flight idle, and approach may generally define low power conditions. Takeoff, climb, and cruise may generally define mid- and high-power conditions. It should be appreciated that the engine operating conditions may be defined in other contexts, such as those for marine and industrial gas turbine engines, and may define low, mid, and high power conditions generally corresponding to the aforementioned conditions. Still further, one or more steady state conditions may be defined between one or more of the aforementioned conditions.

In various embodiments, the method 1000 may include at 1060 determining a plurality of ranges of pilot fuel flow to the pilot fuel circuit. Each range of pilot fuel flow may define a plurality of minimum fuel flow values and a plurality of maximum fuel flow values to the pilot fuel circuit. Each range of fuel flow is based on a combustion criterion.

Still further, in various embodiments, the method 1000 at 1020 may include determining one or more of the ranges of ratios of main fuel flow versus pilot fuel flow based on one or more of engine inlet temperature (T1), low/intermediate compressor inlet temperature (T2), high compressor inlet temperature (T25), P3, T3, fuel flow rate, air flow rate at the combustor (Wa36), main fuel/air equivalence ratio, pilot fuel/air equivalence ratio, FAR4, P4, combustion exit temperature (T41), turbine exit temperature, exhaust gas temperature, low or fan rotor speed (e.g., N1, Nfan, or Nlow), high rotor speed (e.g., N2 or Nhigh), one or more bleed air flow rates at the combustion section, and one or more pressure or flow limits, ratios, or ranges described herein. It should be appreciated that T3 and P3 refer generally to the temperature and pressure of air, respectively, exiting the compressor section (e.g., exiting the HP compressor 24 into the combustion section 26). The FAR4 refers generally to an overall fuel-air ratio at the combustion chamber (e.g., combustion chamber 116). For example, FAR4 may refer to the total flow of fuel at the main fuel circuit and the pilot fuel circuit over the total flow of air at the combustion chamber.

In one embodiment, the method 1000 at 1020 may include determining a minimum and a maximum flow of fuel to the pilot fuel circuit. The minimum and maximum flow of fuel to the pilot fuel circuit may define a range of pilot fuel-air ratios. For example, determining the minimum and maximum flow of fuel to the pilot fuel circuit includes determining the minimum and maximum flow of fuel through the pilot fuel conduit 126 and the pilot supply line 127. As another example, determining the minimum and maximum flow of fuel to the pilot fuel circuit includes determining the minimum and maximum flow of fuel through the pilot fuel conduit 126 before the pilot fuel is then split into two or more pilot supply lines (e.g., the primary pilot supply line 128 and the secondary pilot supply line 130 generally shown in FIGS. 1-6).

In other embodiments, determining the minimum and maximum flow of fuel to the pilot fuel circuit may include determining the overall sum maximum flow of fuel through a plurality of pilot fuel circuits, such as a plurality of pilot fuel conduits each coupled independently to a plurality of pilot supply lines. For example, each pilot fuel conduit may be independently coupled to a primary pilot supply line 128 and a secondary pilot supply line 130.

Another embodiment of the method 1000 at 1020 may include determining range of ratios based on a minimum overall pilot fuel flow rate (Wfp) based on T3. Determining the minimum overall Wfp may generally determine the minimum allowable flow rate of fuel through the pilot fuel circuit, such as through one or more of the pilot fuel conduit 126, the pilot supply line 127, or each supply line therefrom (e.g., the primary pilot supply line 128, and the secondary pilot supply line 130) of each fuel nozzle assembly 117. Determining the minimum overall Wfp may protect against fuel coking (i.e., carbon deposit formation) within the pilot fuel circuit. For example, a pilot fuel flow rate Wfp below the determined minimum may result in fuel coking within the pilot fuel circuit.

In yet another embodiment, the method 1000 may further include at 1020 determining a range of ratios based on a lean blow out limit. For example, determining the minimum ratio of main fuel flow versus pilot fuel flow may ensure the combustor assembly remains lit (i.e., combustion of fuel and air is occurring) at all engine operating conditions. In various embodiments, the lean blow out limit is based on one or more of aP3, T3, and FAR4. In one embodiment, the lean blow out limit is based on one or more of a reference table, chart, or curve including at least a minimum overall pilot fuel flow versus P3, a T3, and FAR4.

Although FIGS. 7A and 7B depict steps performed in a particular order for purposes of illustration and discussion, those of ordinary skill in the art, using the disclosures provided herein, will understand that the various steps of any of the methods disclosed herein can be modified, adapted, expanded, rearranged and/or omitted in various ways without deviating from the scope of the present disclosure.

The combustion system in which the steps and various embodiments of the method 1000 are performed may define approximately 5% to approximately 30% of an overall amount of fuel (Wf) to the pilot fuel circuit of the combustion system and approximately 95% to approximately 70% of the overall amount of fuel Wf to the main fuel circuit. Accordingly, in one embodiment of the combustion system and method 1000 defining a primary pilot fuel supply line and a secondary pilot fuel supply line, a portion of approximately 5% to approximately 30% of the overall amount of fuel Wf is subdivided between the primary pilot fuel supply line and the secondary pilot fuel supply line. Still further, the combustion system and method 1000 may include a tertiary or more pilot fuel supply line, of which the portion of pilot fuel is further subdivided.

In still another embodiment, the combustion system in which the steps and various embodiments of the method 1000 are performed may define a total airflow into the combustor system (Wa36). In various embodiments, approximately 30% to approximately 70% of Wa36 flows across the main fuel injector 180 to mix with fuel from the main fuel flow for combustion. In one embodiment, the combustion system 100 and the method 1000 define a lean burn combustion system. In another embodiment, the combustion system 100 and the method 1000 define a rich burn combustion system. It should be appreciated that in various embodiments of the combustion system 100 and methods 1000 of operation, a portion of the total flow of air to the combustion chamber may be siphoned or bled off for engine cooling, or directed within the combustion system 100 to provide quenching or cooling of the combustion products produced therein. As such, one or more flow decimals or fractions may be applied to one or more of the aforementioned steps or embodiments of the method 1000 that may be applied against the total flow of air at the combustion chamber.

It should further be appreciated that the embodiments of the method 1000 may be controlled or executed by a system including one or more processors and one or more memory devices. The one or more memory devices can store instructions that when executed by the one or more processors cause the one or more processors to perform operations. The instructions or operations generally include one or more of the steps of method 1000, and embodiments thereof, described herein. The instructions may be executed in logically and/or virtually separate threads on the processor(s). The memory device(s) may further store data that may be accessed by the processor(s), including, but not limited to, engine inlet temperature (T1), low/intermediate compressor inlet temperature (T2), high compressor inlet temperature (T25), P3, T3, fuel flow rate, air flow rate at the combustor (Wa36), main fuel/air equivalence ratio, pilot fuel/air equivalence ratio, FAR4, P4, combustion exit temperature (T41), turbine exit temperature, exhaust gas temperature, low or fan rotor speed (e.g., N1, Nfan, or Nlow), high rotor speed (e.g., N2 or Nhigh), one or more bleed air flow rates at the combustion section, and one or more pressure or flow limits, ratios, or ranges described herein.

Still further, it should be appreciated that one or more parameters discussed in regard to the method 1000 or the system for executing the method 1000 may include measurement, calculation, extrapolation, interpolation, etc. of the parameters. For example, one or more of the parameters (e.g., P1, T1, P2, T2, P25, T25, P3, T3, Wa3, Wa36, Wf, FAR4, T4, T41, T45, EGT, N1, N2, main fuel/air equivalence ratio, pilot fuel/air equivalence ratio, etc.) may be calculated from at least one or more of another of the parameters to yield an approximation or actual value of the one or more parameters. Furthermore, one or more parameters described herein may include corrected values based on one or more other parameters (e.g., N1 or N2 mechanical speed versus a corrected N1 or N2 based on a flowpath temperature, e.g., T1, T2, T25, etc.).

The system may further include a network interface used to communicate, send, transmit, receive, or process one or more signals to the engine 10, including the compressor section, the fuel system 122, the combustor assembly 100, and the fuel nozzle assembly 117, to direct or adjust a flow of fuel and air to the combustion section 26. The network interface may include one or more of a transmitter, receiver, port, controller, antenna, or other suitable communications components or apparatuses. In various embodiments, the system may define, but is not limited to, an electronic engine controller (EEC), an analog controller, or a full authority digital engine controller (FADEC), or a subsystem thereof, such as a fuel controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a combustion system comprising a fuel nozzle defining at least one main fuel circuit and at least one pilot fuel circuit, the method comprising:
   determining an overall flow of fuel, the overall flow of fuel defining a sum total fuel through the at least one main fuel circuit and the at least one pilot fuel circuit;
   determining a plurality of ranges of ratios of a main fuel flow through the at least one main fuel circuit versus a pilot fuel flow through the pilot circuit from the overall flow of fuel, wherein each range of the plurality of ranges of ratios is based on a combustion criterion different from one another;
   determining a resultant range of ratios of the main fuel flow versus the pilot fuel flow based on a hierarchy of the combustion criterion, wherein the hierarchy of the combustion criteria provides a priority ranking of the combustion criterion; and
   flowing the overall flow of fuel to the at least one main fuel circuit and the at least one pilot fuel circuit based on the resultant range of ratios of the main fuel flow versus the pilot fuel flow.

2. The method of claim 1, further comprising:
   determining a ratio of the main fuel flow versus the pilot fuel flow within the resultant range of ratios, wherein the ratio of the main fuel flow versus the pilot fuel flow is based on an engine operating condition.

3. The method of claim 2, wherein the determining the ratio of the main fuel flow versus the pilot fuel flow based on the engine operating condition is further based on whether the engine operating condition is a steady state operating condition or a transient operating condition.

4. The method of claim 2, wherein the determining the ratio of the main fuel flow versus the pilot fuel flow further includes:
   determining a first ratio of the main fuel flow versus the pilot fuel flow based on a steady state engine operating condition; and
   determining a second ratio of the main fuel flow versus the pilot fuel flow based on a transient engine operating condition.

5. The method of claim 1, further comprising:
   determining a second plurality of ranges of the pilot fuel flow to the at least one pilot fuel circuit, wherein each range of the second plurality of ranges of the pilot fuel flow defines a plurality of minimum fuel flow values and a plurality of maximum fuel flow values to the at least one pilot fuel circuit, wherein each range of the second plurality of ranges of the pilot fuel flow is based on a combustion criterion.

6. The method of claim 1, wherein the combustion criterion includes two or more of an emissions limit, a lean blow out limit, a rich blow out limit, a combustion stability limit, a desired combustion efficiency, and a fuel pressure range.

7. The method of claim 1, further comprising:
   determining a minimum main fuel flow relative to a compressor exit pressure (P3) at which the main fuel flow is provided through at least one the main fuel circuit.

8. The method of claim 7, wherein determining the minimum P3 at which the main fuel flow is provided through the at least one main fuel circuit is based on a maximum purge fluid pressure through the at least one main fuel circuit.

9. The method of claim 1, further comprising:
   determining a minimum difference from compressor exit pressure (P3) and a main fuel pressure (Pfm) through the s one main fuel circuit based at least on compressor exit temperature (T3) and the exit pressure (P3).

10. The method of claim 1, wherein the determining the plurality of ranges of ratios of the main fuel flow versus the pilot fuel flow further comprises:
    determining a first range of ratios of the main fuel flow versus the pilot fuel flow based on a durability parameter of one or more of a combustor liner, a dome assembly, a fuel nozzle, or a turbine nozzle.

11. The method of claim 1, wherein the determining the plurality of ranges of ratios of the main fuel flow versus the pilot fuel flow further comprising:
   determining a second range of ratios of the main fuel flow versus the pilot fuel flow based on a minimum valve pressure to flow fuel through all fuel nozzles.

12. The method of claim 1, wherein the determining the plurality of ranges of ratios of the main fuel flow versus the pilot fuel flow further comprising:
   determining a third range of ratios of the main fuel flow versus the pilot fuel flow based on a combustion acoustic parameter.

13. The method of claim 1, wherein the determining the plurality of ranges of ratios of the main fuel flow versus the pilot fuel flow further comprising:
   determining a fourth range of ratios of the main fuel flow versus the pilot fuel flow based on at least compressor exit pressure (P3), compressor exit temperature (T3), and combustion fuel-air ratio (FAR4).

14. The method of claim 1, further comprising:
   adjusting the overall flow of fuel to the at least one main fuel circuit and the at least one pilot fuel circuit based on a change in engine operating conditions.

15. A gas turbine engine comprising a combustion system, the combustion system comprising a fuel controller and a fuel nozzle defining a main fuel circuit and pilot fuel circuit, the fuel controller comprising one or more processors and one or more memory devices, the one or more memory devices storing instructions that when executed by the one or more processors cause the one or more processors to perform operations, the operations comprising:
   determining, via the fuel controller, an overall flow of fuel, the overall flow of fuel defining a sum total fuel through the main fuel circuit and the pilot fuel circuit;
   determining, via the fuel controller, a plurality of ranges of ratios of main fuel flow through the main fuel circuit versus pilot fuel flow through the pilot circuit from the overall flow of fuel, wherein each range of the plurality of ranges of ratios is based on a combustion criterion different from one another;
   determining, via the fuel controller, a resultant range of ratios of the main fuel flow versus the pilot fuel flow based on a hierarchy of the combustion criterion, wherein the hierarchy of the combustion criteria provides a priority ranking of the combustion criterion; and
   flowing, through the fuel nozzle, the overall flow of fuel to the main fuel circuit and the pilot fuel circuit based on the resultant range of ratios of the main fuel flow versus the pilot fuel flow.

16. The gas turbine engine of claim 15, the operations further comprising:
   determining, via the fuel controller, a ratio of the main fuel flow versus the pilot fuel flow within the resultant range of ratios, wherein the ratio of the main fuel flow versus the pilot fuel flow is based on an engine operating condition.

17. The gas turbine engine of claim 15, wherein the operations determining the ratio of the main fuel flow versus the pilot fuel flow further comprises:
   determining, via the fuel controller, a first ratio of the main fuel flow versus the pilot fuel flow based on a steady state engine operating condition; and
   determining, via the fuel controller, a second ratio of the main fuel flow versus the pilot fuel flow based on a transient engine operating condition.

18. The gas turbine engine of claim 15, the operations further comprising:
   determining, via the fuel controller, a second plurality of ranges of the pilot fuel flow to the pilot fuel circuit, wherein each range of the second plurality of ranges of the pilot fuel flow defines a plurality of minimum fuel flow values and a plurality of maximum fuel flow values to the pilot fuel circuit, wherein each range of the second plurality of ranges of the pilot fuel flow is based on a combustion criterion.

19. The gas turbine engine of claim 15, the operations further comprising:
   determining, via the fuel controller, a minimum main fuel flow relative to a compressor exit pressure (P3) at which the main fuel flow is provided through the main fuel circuit.

20. The gas turbine engine of claim 15, the operations further comprising:
   determining, via the fuel controller, a minimum difference from compressor exit pressure (P3) and a main fuel pressure (Pfm) through the main fuel circuit based at least on compressor exit temperature (T3) and the exit pressure (P3).

* * * * *

UNITED STATES PATENT AND TRADEMARK OFFICE
CERTIFICATE OF CORRECTION

PATENT NO. : 11,408,356 B2  
APPLICATION NO. : 15/723303  
DATED : August 9, 2022  
INVENTOR(S) : Steven Clayton Vise et al.

It is certified that error appears in the above-identified patent and that said Letters Patent is hereby corrected as shown below:

In the Claims

Claim 9, Column 18, Lines 58-59, "and a main fuel pressure (Pfm) through the s one main fuel circuit based at least on compressor" should be -- and a main fuel pressure (Pfm) through the at least one main fuel circuit based at least on compressor --

Signed and Sealed this  
Twenty-seventh Day of September, 2022

Katherine Kelly Vidal  
*Director of the United States Patent and Trademark Office*